United States Patent [19]
McGuire

[11] Patent Number: 5,562,010
[45] Date of Patent: Oct. 8, 1996

[54] REVERSING DRIVE

[76] Inventor: Bernard McGuire, 211 Cochran Rd., Hamilton Ontario, Canada, L8K 3G5

[21] Appl. No.: 165,670

[22] Filed: Dec. 13, 1993

[51] Int. Cl.⁶ .................................................. F15B 11/02
[52] U.S. Cl. .................................. 74/129; 74/126; 91/1; 92/68
[58] Field of Search ........................... 74/128, 129, 126, 74/817; 91/1, 533, 534; 92/22, 68

[56] References Cited

U.S. PATENT DOCUMENTS

| | | | |
|---|---|---|---|
| 1,077,118 | 10/1913 | Bissell | 74/129 |
| 4,038,128 | 7/1977 | Mueller | 156/355 |
| 4,538,505 | 9/1985 | Morillon | 91/534 |
| 4,860,554 | 8/1989 | Innes et al. | 62/374 |

Primary Examiner—Charles A. Marmor
Assistant Examiner—Chong H. Kim
Attorney, Agent, or Firm—McConnell and Fox

[57] ABSTRACT

A shaft is provided with a low speed oscillating progressive drive by means of hydraulic cylinders which operate a lever mechanism which may be clutched to and declutched from, the shaft. A pneumatic control system senses the position of the pistons of the hydraulic cylinders and provides a controlled oscillation of the cylinders. When the pistons cause the shaft to rotate in one direction a sensor causes the lever mechanism to be declutched from the shaft after a selectable number of degrees of rotation. The pistons continue their stroke to the normal limit where the lever mechanism is caused to be once more clutched to the shaft. This operation is continued producing an oscillatory progressive rotation of the shaft.

12 Claims, 5 Drawing Sheets

REVERSING DRIVE

FIELD OF THE INVENTION

This invention relates to hydraulic pneumatic oscillating drives and particularly to low speed progressive drives.

DESCRIPTION OF THE PRIOR ART

This invention has particular application to the chiller described in U.S. Pat. No. 4,860,554 issued Aug. 29, 1989.

The apparatus described in that patent requires a drive mechanism for the screw which provides a oscillatory motion and a net rotation of screw to produce a progressive motion of the product being processed. Such a motion may be termed an oscillating rotation where the forward degrees of rotation of the drive only slightly exceed the reverse degrees of rotation.

It was assumed that such a drive could be provided in various ways for example by a programmed electric motor drive including a reversing motor, a suitable gear reduction, and a cam switch for controlling the motor supply. While such a drive can be used there are advantages to avoiding electrical equipment in the vicinity of food process lines and similar wet locations. In addition the shocks on the system created by the activation and deactivation of the electric motor caused severe stress on the mechanism.

The present invention provides a simple and economic oscillating progressive drive using only hydraulic and pneumatic power.

SUMMARY OF THE INVENTION

A chiller screw is driven by hydraulic cylinders which operate a lever mechanism clutched to the screw shaft by a pneumatically operated clutch. The cylinders each operate the lever to cause a shaft to rotate in one direction on one direction of stroke and in the opposite direction on the opposite direction of stroke. By clutching the lever mechanism to the screw shaft during portions of the lever mechanism motion the screw shaft is caused to rotate with a progressive oscillating action.

A clearer understanding of my invention may be had from a consideration of the following description and drawings in which:

DESCRIPTION OF THE PREFERRED EMBODIMENTS

Figure 1:
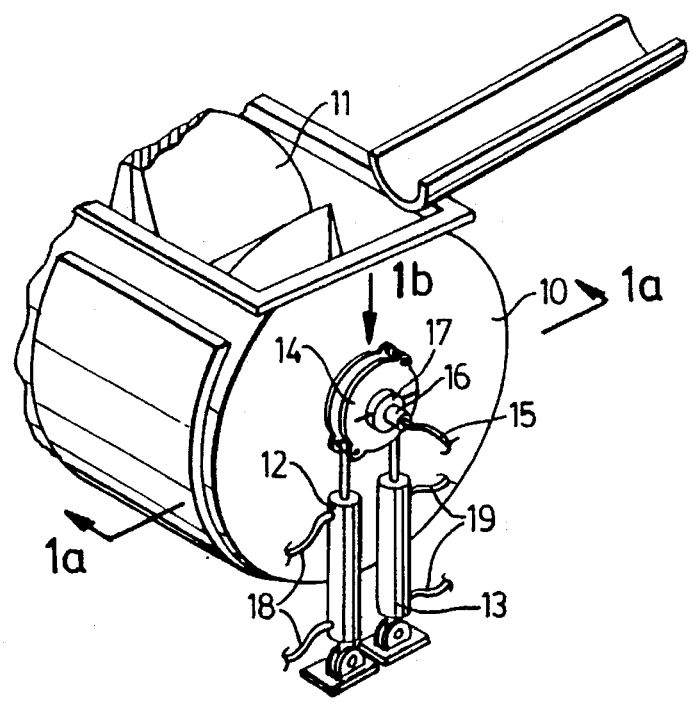
FIG. 1 is an isometric view of a chiller including a drive according to my invention.
Figure 1A:
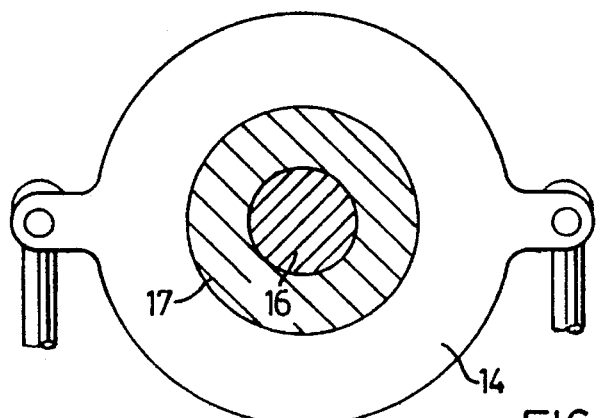
FIG. 1a is an enlarged view of the lever mechanism of the drive on section line 1a—1a of FIG. 1.
Figure 1B:
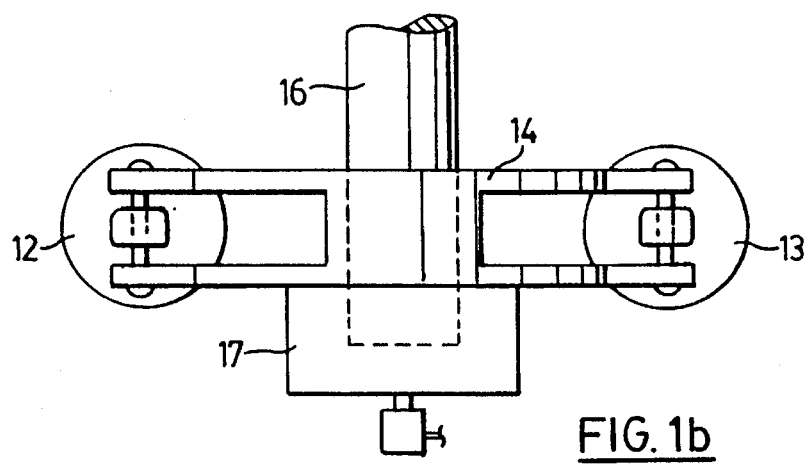
FIG. 1b is an enlarged view of the lever mechanism of the drive as viewed in the direction 1b in FIG. 1.

Considering first FIG. 1 there is shown an isometric view of a portion of a chiller in accordance with U.S. Pat. No. 4,860,554 driven by a pneumatic/hydraulic system according to my invention. The chiller includes a trough 10 which contains the cooling fluid and the food to be chilled which is moved along the trough by an auger 11. The rotation of the auger is produced by actuation of the hydraulic cylinders 12 and 13 and lever assembly 14 which may be coupled to the auger shaft 16 by pneumatic clutch 17.

Figure 2:
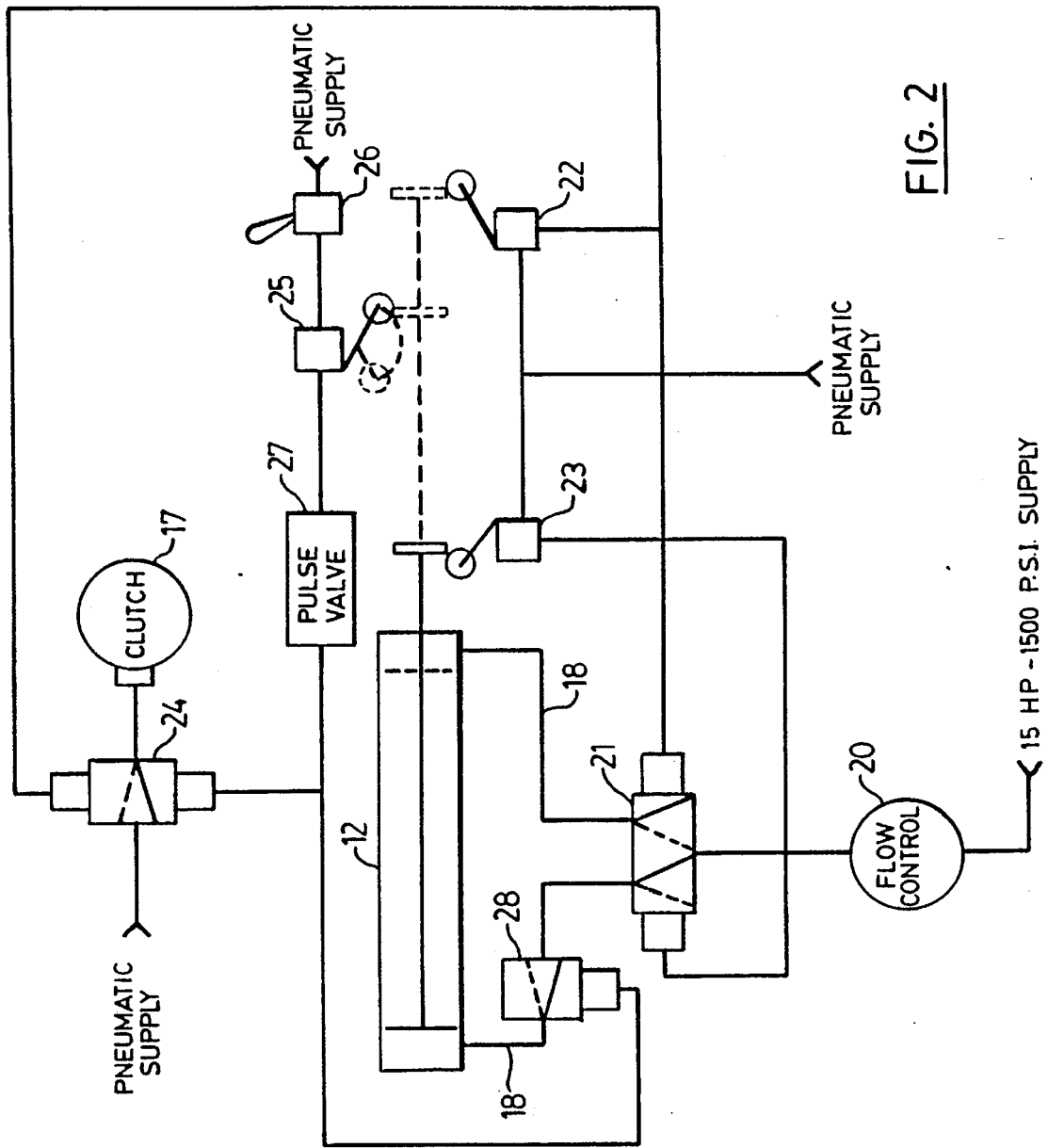
FIG. 2 is a schematic diagram of the control system for the drive of FIG. 1.

The operation of the hydraulic cylinders 12 and 13 and the pneumatic clutch 17 is controlled by the control system shown in FIG. 2. The operation of the system will be described in relation to hydraulic cylinder 12 and the same general description applies to cylinder 13.

The cylinder 12 is supplied from a suitable source of hydraulic fluid under pressure through flow control 20 and pneumatically actuated valve 21 and hydraulic lines 18. A pair of pneumatic valve limit switches 22 and 23 are provided with air under pressure from a suitable source. The operation of valve 21 is controlled by limit switches 22 and 23 which detect the position of the piston in the hydraulic cylinder 12, control the air supplied from the pneumatic source to valve 21 and terminate the flow of hydraulic fluid to one end or the other of the cylinder 12 when the desired stroke length is attained. The motion of the piston in hydraulic cylinder 12 causes the drive lever assembly 14 to rotate on shaft 16. The pneumatic clutch 17, when supplied with air under pressure from the pneumatic source through valve 24, clutches drive lever assembly 14 to the auger shaft 16 causing the shaft to oscillate as the piston travels back and forth between its limits as determined by the limit switches 22 and 23.

Valve 25 is a unidirectional limit which is only actuated as the piston of cylinder 12 moves from left to right as viewed in the drawing. If pneumatic supply pressure is provided through valve 26 to valve 25 then, when valve 25 is actuated by the piston of cylinder 12, the air supplied from valve 25 will actuate pulse valve 27 causing a timed pulse of air to be supplied to spring return valve 28 stopping the flow of hydraulic fluid to cylinder 12 and thus stopping shaft rotation. At the same time the pulse of air will be applied to valve 24 cutting off the supply to clutch 17 and disengaging drive lever assembly 14 from shaft 16.

At the end of the timed pulse from valve 27 valve 28 will return to its open condition permitting flow of hydraulic fluid and cylinder 12 will complete its stroke as determined by limit switch 22. Clutch 17, however remains disengaged and the shaft is not rotated while lever assembly 14 rotates on the shaft 16.

At the end of the stroke of cylinder 12, limit switch 22 is actuated and, as well as actuating valve 21, it also actuates valve 24 and re-engages clutch 17, once more coupling lever assembly 14 to shaft 16.

Cylinder 13 is actuated in the same manner with drive lever assembly 14 actuated by the piston of cylinder 13 thus providing a balanced torque on shaft 16.

OPERATION

With suitable air and hydraulic supplies the operator adjusts control 20 to provide a suitable rate of rotation of the auger considering the amount of fluid and food in the trough 10. The auger oscillates back and forth, preferably through 90°, as determined by the position of limit switches 22 and 23 which can be positioned by the installer to provide this degree of rotation. If now the operator actuates valve 26 pulse valve 27 is activated when the piston passes limit switch 25. The activation of pulse valve 27 actuates spring return valve 28 and stops the motion of the cylinder 12 momentarily. At the same time the pulse from pulse valve 26 activates valve 24 which deactivates clutch 17 and declutches lever mechanism 14 from shaft 16 thus stopping rotation of the shaft and auger 11.

At the end of the pulse from pulse valve 27 spring return valve 28 returns to its open position permitting flow of hydraulic fluid to cylinder 12 which then continues its stroke until it reaches the limit switch 22. Limit switch 22 actuates valve 21 causing cylinder 12 to be operated in the opposite direction, that is, from right to left. At the same time the pressure from limit switch 22 is applied to valve 24 which reactivates clutch 17 and reclutches lever assembly 14 to shaft 16. The position of limit switch 25 can be adjusted to determine the number of degrees of shaft rotation caused by the left to right motion of the piston of cylinder 12. On the return stroke, that is the motion of the piston from right to left, limit switch 25 is not actuated because of its hinged actuator which simply swings out of the way and does not actuate the switch 25 on the return stroke. The lever assembly 14 is, however, clutched to shaft 16 and causes the shaft 16 to rotate its maximum rotation. The result is that a left to right movement of the piston of cylinder 12 may cause a selectable degree of rotation of shaft 16 while right to left motion of the piston of cylinder 12 always causes a maximum rotation of the shaft as determined by limit switches 22 and 23.

Figure 3:
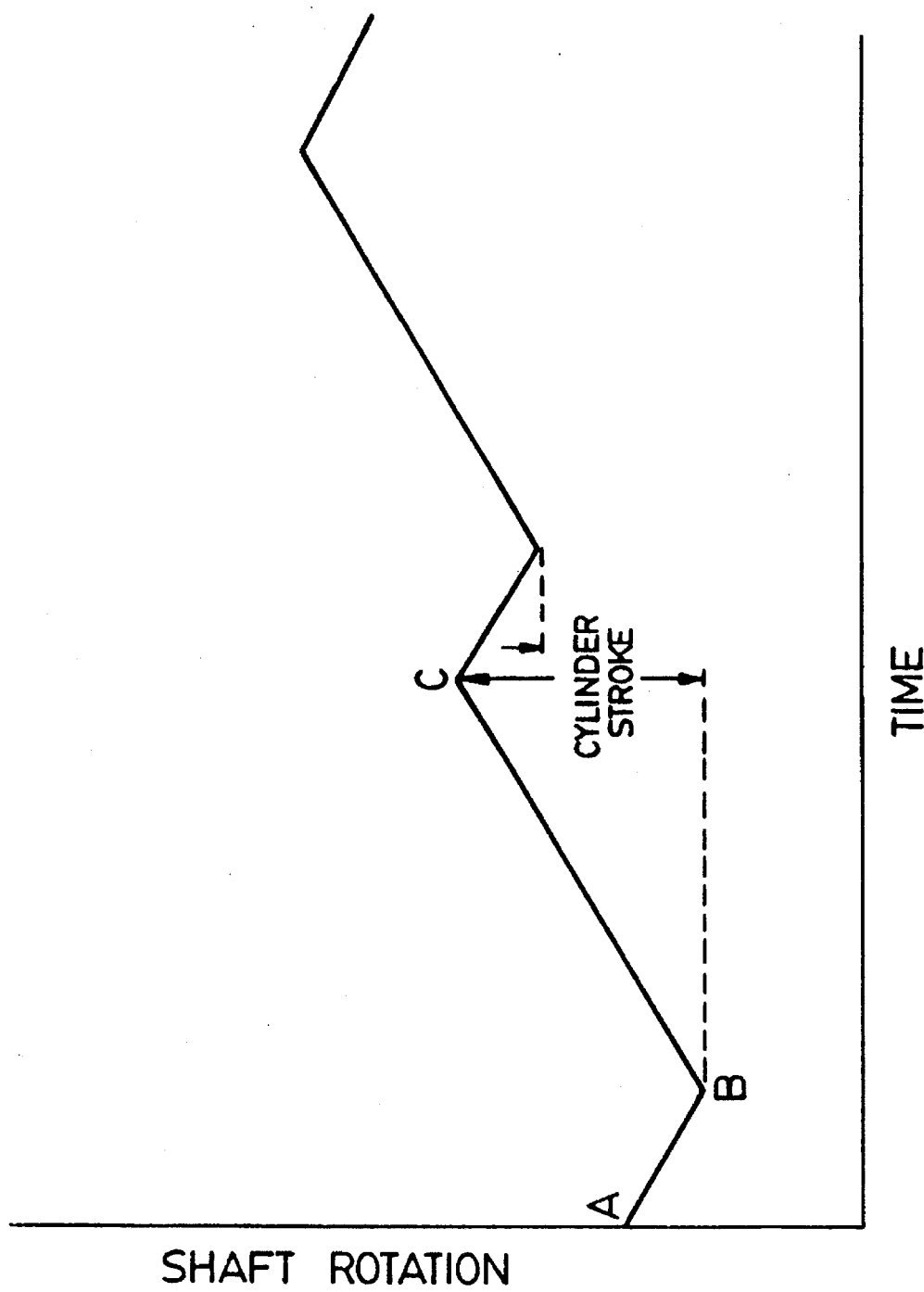
FIG. 3 is a graphical representation of the rotational motion created by the drive.

As may be seen in FIG. 3 the shaft rotational position changes with a velocity (slope) depending upon the setting of flow control 20 and in steps; step A-B depending upon the positioning of limit switch 25; step B-C depending upon the positioning of limit switches 22 and 23. As a result the shaft 16 and auger 11 rotate in an oscillatory but progressive manner moving the food in the trough back and forth but gradually to one end of the trough in a manner completely under the control of the operator.

Adjustments of the amount of oscillation i.e. the positioning of switch 25 and the rate of progress of the food through the trough i.e. the adjustment of the flow control 20, can be made while the machine is operating.

Because the clutch 17 is operated only while the cylinder 12 is deactivated wear on the clutch, is minimized and stress on the whole system is reduced.

SECOND EMBODIMENT

Figure 4:
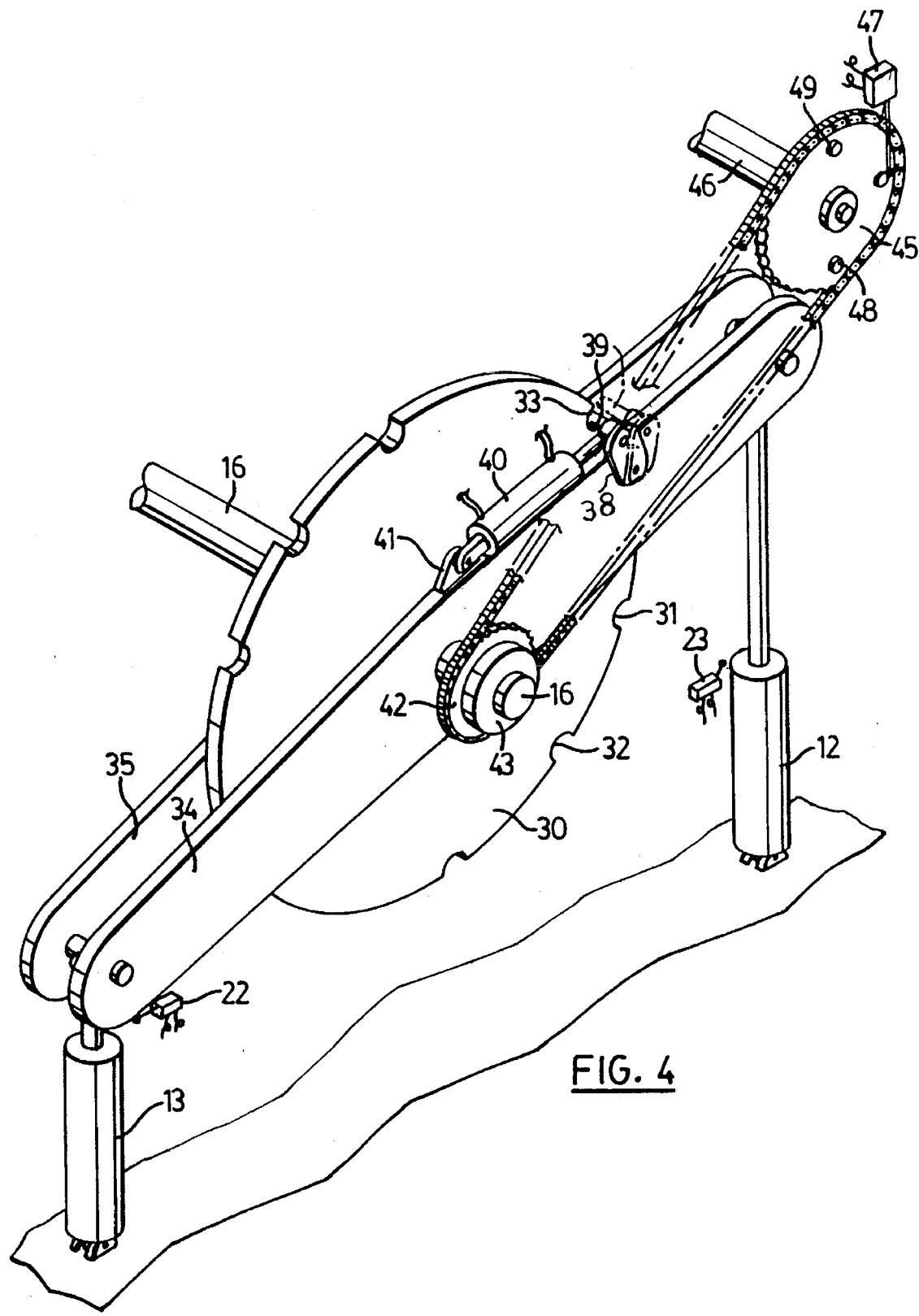
FIG. 4 is a isometric drawing, illustrating an alternative clutch mechanism in accordance with my invention.

While the drive described in association with FIG. 1 has the advantage virtually infinitely variable ratio of oscillation to forward progress, the clutch required may be expensive and a cheaper somewhat less flexible clutching arrangement is illustrated in FIG. 4.

As will be seen in FIG. 4 an indexing wheel 30 with a number of notches such as notches 31, 32, 33 around its periphery, is fixedly mounted on shaft 16. A pair of levers, 34 and 35 are rotatably mounted on shaft 16 on each side of indexing wheel 30. A lever 38 pivotaly mounted on lever 34 has a dog 39 on its end which conforms to the notches 31, 32, 33. A double acting hydraulic cylinder 40 is connected between the end of lever 38 and a bracket 41 on lever 34. A sprocket 42 is mounted by means of a sprag clutch 43 onto shaft 16. A chain 44 couples sprocket 42 to sprocket 45 mounted on a jackshaft 46. A pneumatic switch 47 is actuated by pins, such as pins 48 and 49 on sprocket 45. As in the previous embodiment the lever mechanism is actuated by hydraulic cylinders 12 and 13. The pneumatic limit switches 22 and 23 are mounted below lever 34 rather than in the travel of hydraulic cylinder 12 as in FIG. 1.

Figure 5:
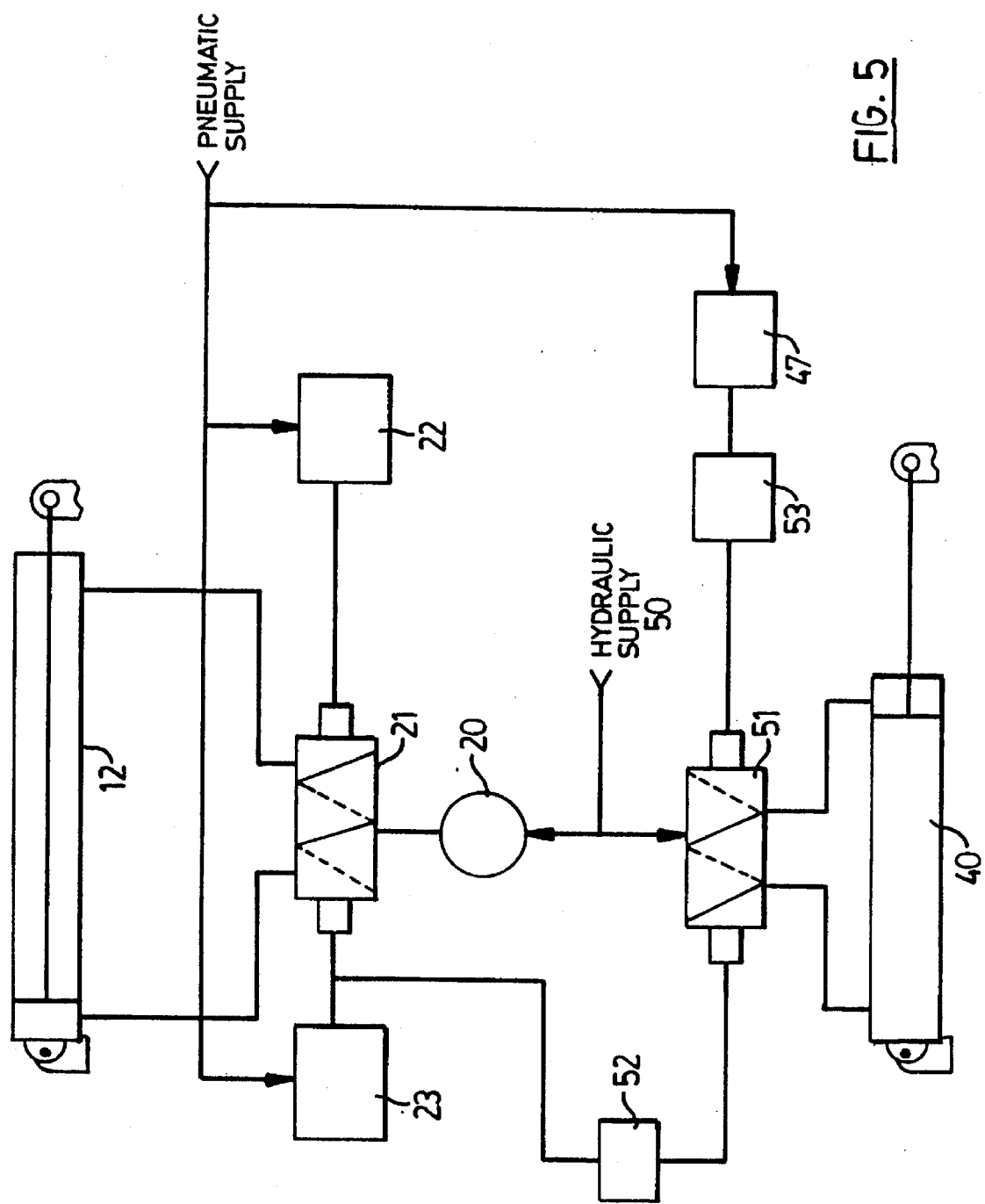
FIG. 5 is a schematic diagram of the control system for the drive of FIG. 4.

Turning now to FIG. 5, where the same designations are used for components which correspond to components in FIG. 2, it will be seen that as before four way hydraulic valve 21 is supplied with hydraulic fluid from source 50 through flow control valve 20. The operation of valve 21 is controlled as before by limit switches 22 and 23. A four way double pilot valve 51 controls the supply of hydraulic fluid to cylinder 40 and is pneumatically controlled by pulse valve 52 and pulse valve 53, the former supplied with air from limit switch 23 and the latter supplied with air from pneumatic switch 47.

OPERATION

The flow control valve 20 is opened to permit hydraulic fluid to operate cylinders 12 and 13 causing the levers 34 and 35 to tilt back and forth and, if the dog 39 on the end of lever 38 is locked into a notch in wheel 30, cause shaft 16 to rock back and forth through an angle of 45° as determined by the location of limit switches 22 and 23. As the shaft 16 rocks back and forth it drives sprocket 42 in a clockwise direction but not in a counterclockwise direction due to the operation of the sprag clutch 43. Sprocket 45 is similarly driven in a clockwise direction by chain 44. When sprocket 45 rotates to a location where pin 48 contacts switch 47 air is supplied to pulse valve 53 which supplies a short pulse of air to pilot valve 51 causing it to operate cylinder 40 rotating lever 38 and disengaging the dog 39 from the notch in index wheel 30. The levers 34 and 35 are now free to rotate on shaft 16 and on the next stroke of the cylinders 12 and 13 the levers rotate in a counterclockwise direction but the shaft remains stationary. At the end of the counterclockwise rotation lever 34 operates limit switch 22 which not only terminates the cylinder stroke but also supplies air to pulse valve 52 which operates pilot valve 51 causing cylinder 40 to be operated, lever 38 rotated and the dog 39 re-engaged in a notch in index wheel 30. It will be noted that the notches in the index wheel are spaced at 45° so that if the dog is released from the wheel and the levers rotated 45° the dog will properly locate in the next notch. For the same reason it is necessary that limit switches 22 and 23 be properly located to cause a 45° rotation for each stroke of cylinders 12 and 13.

By selecting the number of pins on sprocket 45 and the ratio of teeth on sprockets 42 and 45 any desired proportion of forward travel to oscillation may be selected and, while not infinitely adjustable as in the previous example, this system is broadly adjustable.

While described in association with a particular equipment it will be understood that this oscillatory progressive drive may find application wherever a simple rugged drive system of this nature is required.

The system has been described incorporating two hydraulic cylinders but any number may be used as convenient. The arrangement illustrated minimizes side thrust on shaft 16 by applying thrust equally on both sides of the shaft thus producing a couple.

I claim:

1. An oscillating progressive rotary hydraulic drive comprising;

a shaft;

at least one hydraulic cylinder with its piston connected to a lever mechanism which is connectable to said shaft through a clutch;

an hydraulic fluid supply connectable to said hydraulic cylinder;

control means to control the supply of hydraulic fluid to said hydraulic cylinder so as to cause said piston to reciprocate;

control means to control said clutch to cause said lever to be coupled to said shaft during a portion of the reciprocatory stroke of said piston in one direction and during a greater portion of the stroke of said piston in the opposite direction.

2. A drive as claimed in claim 1 including at least two hydraulic cylinders.

3. A drive as claimed in claim 1 wherein said control system is a pneumatic control system.

4. A drive as claimed in claim 3 wherein said clutch is a pneumatic clutch.

5. A progressive oscillating rotary drive including a shaft, a lever mechanism coupled to said shaft through a pneumatic clutch, an hydraulic cylinder including a piston connected to said lever mechanism, a supply of hydraulic fluid connectable to said cylinder, means to control the supply of hydraulic fluid to said cylinder to cause said piston to reciprocate with a forward and backward motion, means to operate said clutch to connect said lever mechanism to said shaft during a portion of the said forward motion of said piston and during a greater portion of said backward motion whereby said shaft oscillates and rotates progressively.

6. A drive as claimed in claim 5 including a pair of cylinders both of which are supplied with hydraulic fluid and both of which have pistons connected to said lever mechanism but on opposite sides of said shaft.

7. A drive system as claimed in claim 5 including a manual flow control valve for controlling the supply of hydraulic fluid to said cylinder.

8. A drive system as claimed in claim 7 wherein said means to control the supply of hydraulic fluid to said cylinder is a pneumatically controlled two way hydraulic valve supplied with hydraulic fluid from said control valve supplying hydraulic fluid to alternate ends of said cylinder as determined by the position of said two way valve.

9. A drive system as claimed in claim 8 including pneumatic limit switches for detecting the position of the said piston of said hydraulic cylinder and controlling the operation of said two way hydraulic valve.

10. A drive system as claimed in claim 9 including a one way pneumatic detector switch for detecting the position of said piston and, when said piston reaches a specific location, deactivating said clutch and momentarily preventing flow of hydraulic fluid to said cylinder.

11. A drive system as claimed in claim 10 wherein activation of said clutch is restored by a signal from one of said limit switches when the piston reaches the limit of its travel.

12. A low speed hydraulic pneumatic progressive rotary drive system comprising:

a driven shaft;

a lever mechanism pivoted on said shaft;

an indexing wheel fixedly mounted on said shaft adjacent said lever mechanism;

at least one hydraulic cylinder connected to said lever mechanism whereby operation of said hydraulic cylinder causes rotation of said lever mechanism;

limit switches operated by said lever mechanism to control the length of stroke of said hydraulic cylinder and thus the corresponding number of degrees of rotation of said lever mechanism;

hydraulically operated means to couple said lever mechanism to said indexing wheel;

a rotary cam coupled to said shaft through unidirectional drive means whose rotary position is representative of the rotary motion of the shaft in one direction only;

a pneumatic control valve actuated by said cam and controlling said hydraulically operated means;

whereby said lever mechanism is couple to said indexing wheel only during selected rotations of said lever mechanism.

* * * * *